(12) United States Patent
Martin et al.

(10) Patent No.: US 9,278,588 B2
(45) Date of Patent: Mar. 8, 2016

(54) TIRE PRESSURE ADJUSTMENT SYSTEM AND METHOD

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/249,633

(22) Filed: Apr. 10, 2014

(65) Prior Publication Data

US 2015/0290985 A1    Oct. 15, 2015

(51) Int. Cl.
B60C 23/00    (2006.01)
G05D 16/02    (2006.01)
G05D 16/16    (2006.01)

(52) U.S. Cl.
CPC ............. B60C 23/002 (2013.01); B60C 23/001 (2013.01); G05D 16/02 (2013.01); G05D 16/166 (2013.01); Y10S 903/903 (2013.01)

(58) Field of Classification Search
CPC .. B60C 23/001; B60C 23/002; B60C 23/003; B60C 23/004
USPC ...................................................... 701/36, 70
See application file for complete search history.

(56) References Cited

U.S. PATENT DOCUMENTS

| 4,763,709 A * | 8/1988 | Scholer .......................... 152/416 |
| 5,452,753 A * | 9/1995 | Olney ................... B60C 23/004 152/417 |
| 6,594,566 B1 * | 7/2003 | Skoff .................... B60C 23/002 152/415 |
| 6,892,776 B2 * | 5/2005 | Skoff .......................... 152/342.1 |
| 6,943,673 B2 * | 9/2005 | Skoff .................... B60C 23/003 137/224 |
| 7,066,226 B1 | 6/2006 | Fiore |
| 8,344,868 B2 | 1/2013 | Browne et al. |
| 2004/0231776 A1 * | 11/2004 | Skoff .................... B60C 23/003 152/416 |
| 2005/0081973 A1 * | 4/2005 | Marin-Martinod ... B60C 23/004 152/415 |
| 2006/0202811 A1 | 9/2006 | Taguchi |
| 2010/0073158 A1 | 3/2010 | Uesaka et al. |
| 2011/0301821 A1 * | 12/2011 | Bujak et al. ...................... 701/70 |
| 2012/0221196 A1 * | 8/2012 | Seymour et al. ................ 701/36 |
| 2013/0030658 A1 * | 1/2013 | Linster ............................ 701/48 |

(Continued)

FOREIGN PATENT DOCUMENTS

| DE | 4012540 A1 * | 9/1990 | ............. B60C 23/00 |
| DE | 10202993 A1 * | 7/2003 | ............. B60C 23/00 |

(Continued)

OTHER PUBLICATIONS

Google machine translation of DE 102011108110 (original DE document published Jan. 24, 2013).*

(Continued)

*Primary Examiner* — Behrang Badii
*Assistant Examiner* — David Testardi
(74) *Attorney, Agent, or Firm* — Carlson, Gaskey & Olds, P.C.

(57) ABSTRACT

An example method includes decreasing the pressure within at least one tire of a vehicle when the vehicle is moving. The decreasing is in response to a condition change. An example assembly includes a sensor and a tire pressure controller that causes a decrease in a pressure within at least one tire of a vehicle in response to a first condition detected by the sensor.

21 Claims, 3 Drawing Sheets

(56) References Cited

U.S. PATENT DOCUMENTS

| | | | |
|---|---|---|---|
| 2014/0012466 A1* | 1/2014 | Tanno | 701/36 |
| 2014/0107889 A1* | 4/2014 | Pierfelice et al. | 701/36 |
| 2014/0156126 A1* | 6/2014 | Tran et al. | 701/22 |
| 2014/0257621 A1* | 9/2014 | Zych | G01C 21/3453 701/25 |
| 2015/0005982 A1* | 1/2015 | Muthukumar | 701/1 |

FOREIGN PATENT DOCUMENTS

| | | | | |
|---|---|---|---|---|
| DE | 102010040539 A1 * | 3/2012 | | B60C 23/00 |
| DE | 202011051292 U1 * | 4/2012 | | |
| DE | 102011108110 A1 * | 1/2013 | | |
| EP | 504913 A1 * | 9/1992 | | B60C 23/00 |
| JP | 2006193015 A * | 7/2006 | | |

OTHER PUBLICATIONS

Google machine translation of DE 10202993 (original DE document published Jul. 31, 2003).*

EPO machine translation of DE 102010040539 (original German document published Mar. 15, 2012).*

* cited by examiner

TIRE PRESSURE ADJUSTMENT SYSTEM AND METHOD

BACKGROUND

This disclosure relates to adjusting tire pressure in a vehicle.

Example hybrid vehicles include hybrid electric vehicles (HEVs), and plug-in hybrid electric vehicles (PHEVs). Generally, hybrid vehicles differ from conventional motor vehicles because hybrid vehicles are selectively driven using a battery-powered electric machine. Conventional motor vehicles, by contrast, rely exclusively on an internal combustion engine to drive the vehicle.

Improving fuel economy is desirable for all vehicles, especially hybrid vehicles. Improvements to fuel economy typically focus on the powertrain efficiency and aerodynamic efficiency.

SUMMARY

A method according to an exemplary aspect of the present disclosure includes, among other things, decreasing pressure within at least one tire of a vehicle when the vehicle is moving. The decreasing is in response to a condition change.

In a further non-limiting embodiment of the foregoing method, the vehicle is an electric vehicle.

In a further non-limiting embodiment of any of the foregoing methods, the condition change comprises a deceleration of the vehicle.

In a further non-limiting embodiment of any of the foregoing methods, it causes the decreasing by actuating an electric valve.

In a further non-limiting embodiment of any of the foregoing methods, the condition change comprises a road disturbance.

In a further non-limiting embodiment of any of the foregoing methods, the road disturbance comprises a predicted increase in the road disturbance based on a monitoring an area of the road that is forward of the vehicle.

In a further non-limiting embodiment of any of the foregoing methods, the condition change comprises a first condition change, and the method further compromises increasing a pressure within at least one tire of the vehicle in response to a second condition change that is different than the first condition change.

In a further non-limiting embodiment of any of the foregoing methods, the second condition change comprises an acceleration of the vehicle.

In a further non-limiting embodiment of any of the foregoing methods, the second condition change comprises a detection of a predicted decrease in a road disturbance based on monitoring an area of the road that is forward of the vehicle.

In a further non-limiting embodiment of any of the foregoing methods, the method further comprises powering the increasing using energy recovered from regenerative braking.

In a further non-limiting embodiment of any of the foregoing methods, the method further comprises capturing an amount of fluid from the at least one tire during the decreasing, and increasing the pressure using the amount of fluid.

In a further non-limiting embodiment of any of the foregoing methods, the method further comprises powering the increasing using a spring that is moved from a less biased position to a more biased position by the at least one tire when the vehicle is moving.

In a further non-limiting embodiment of any of the foregoing methods, the at least one tire comprises a first tire and a second tire, the pressure on the first tire being decreased more than the pressure on second tire in response to the condition change.

In a further non-limiting embodiment of any of the foregoing methods, the pressure on the second tire is maintained during the decreasing.

In a further non-limiting embodiment of any of the foregoing methods, the condition change is a change in a physical position of the vehicle.

An assembly according to another exemplary aspect of the present disclosure includes, among other things, a sensor and a tire pressure controller that causes a decrease in a pressure within at least one tire of a vehicle in response to a first condition detected by the sensor.

In a further non-limiting embodiment of the foregoing assembly, the tire pressure controller causes the decrease when the vehicle is moving.

In a further non-limiting embodiment of any of the foregoing assemblies, the vehicle is an electric vehicle.

In a further non-limiting embodiment of any of the foregoing assemblies, the sensor is a speed sensor.

In a further non-limiting embodiment of any of the foregoing assemblies, the sensor is a road disturbance sensor.

In a further non-limiting embodiment of any of the foregoing assemblies, the tire pressure controller further causes an increase in pressure within the at least one tire of the vehicle in response to a second condition detected by the sensor. The second condition is different than the first condition.

In a further non-limiting embodiment of any of the foregoing assemblies, the assembly includes a container that holds an amount of fluid from the decrease so that the amount of fluid can be reused to increase the pressure.

In a further non-limiting embodiment of any of the foregoing assemblies, the container comprises a bladder.

In a further non-limiting embodiment of any of the foregoing assemblies, the assembly includes a fluid pump to increase the pressure. The fluid pump is at least partially powered by energy from regenerative braking of the vehicle.

In a further non-limiting embodiment of any of the foregoing assemblies, the assembly includes a mechanical piston to increase the pressure. The mechanical piston includes a spring that is moved from a less biased position to a more biased position by the at least one tire when the vehicle is moving.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
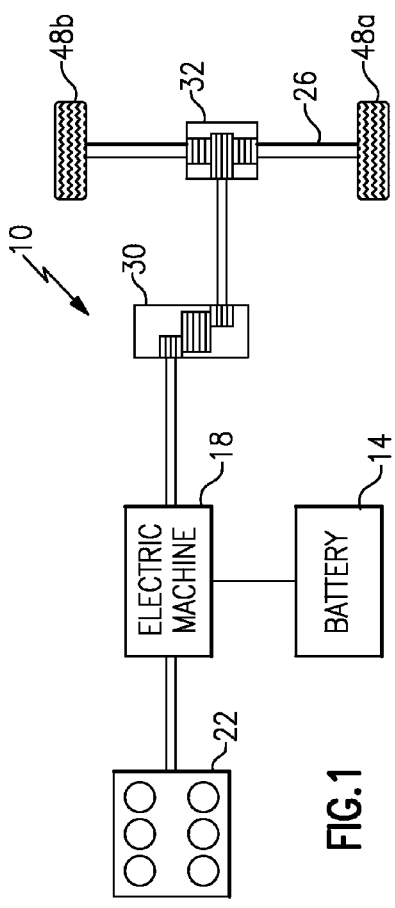
FIG. 1 illustrates a schematic view of an example hybrid transmission for an electric vehicle.

Referring to FIG. 1, an example hybrid powertrain 10 for an electric vehicle includes a battery 14, an electric machine 18, and an internal combustion engine 22. The example powertrain 10 is incorporated into a hybrid electric vehicle (HEV). It should be understood, however, that the concepts described herein are not limited to HEVs and could extend to other vehicles including, but not limited to, plug-in hybrid electric vehicles (PHEVs), battery electric vehicles (BEVs), etc. The battery 14 is a relatively high voltage battery in this example.

In an example embodiment, the powertrain 10 employs a first drive system and a second drive system. The first drive system includes a combination of at least the electric machine 18 and the battery 14. The first drive system can thus be considered an electric drive system of the powertrain 10. The second drive system includes a combination of the internal combustion engine 22 and the electric machine 18.

The first and second drive systems generate torque to drive one or more sets of vehicle drive wheels 26 through a transmission gearbox 30. When the first drive system is employed, a disconnect clutch (not shown) may operably disconnect the internal combustion engine 22 from the remaining portions of the powertrain 10. When the second drive system is employed, the disconnect clutch engages to operably connect the internal combustion engine 22 to the remaining portions of the powertrain 10. The disconnect clutch could remain engaged when the first or second drive system is employed to permit the internal combustion engine 22 to drive the electric machine 18 to charge the battery 14.

The electric machine 18 is a combined motor-generator in this example. In other examples, the electric machine includes a motor and a generator that is separate from the motor.

Figure 2:
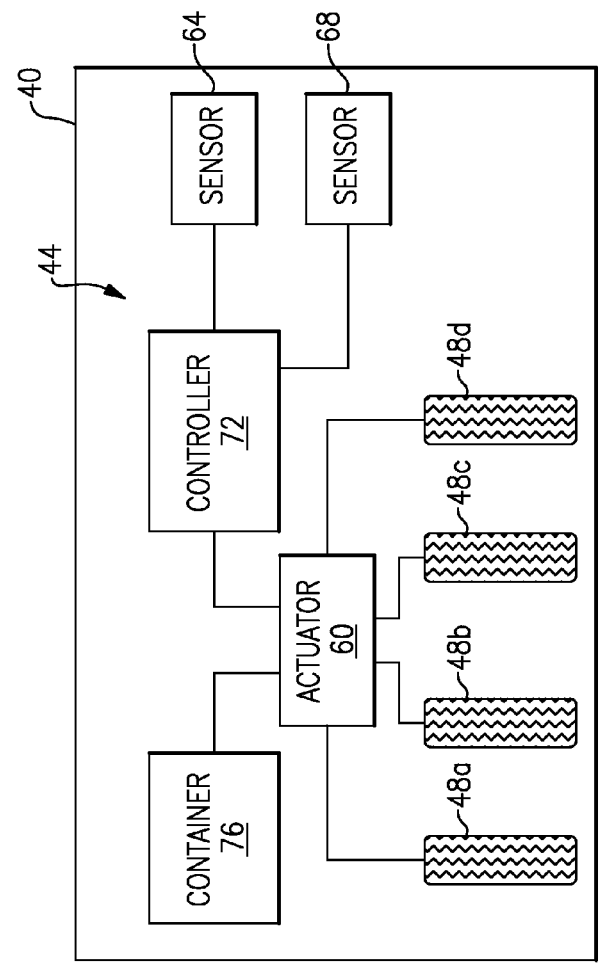
FIG. 2 illustrates a highly schematic view of a vehicle having the hybrid transmission of FIG. 1.

Referring now to FIG. 2 with continued reference to FIG. 1, a vehicle 40 having the powertrain 10 includes four tires 48a to 48d. Two of the tires 48a and 48b provide a set of the drive wheels 26, which are driven by the powertrain 10.

The tires 48a to 48d are pressurized by fluid, for example. The fluid could be a gas or a liquid.

A relatively high pressure in the tires 48a to 48d improves rolling resistance and, thus, fuel economy. However, a relatively high pressure in the tires 48a to 48d can be undesirable for braking and smooth ride requirements.

The vehicle 40 thus includes a tire pressure adjustment system 44 to selectively adjust the pressure within tires of the vehicle 40 when the vehicle 40 is operating. The adjustments are in response to changes in conditions, such as the vehicle 40 changing from a condition where a higher pressure in the tires 48a to 48d is desirable to another condition where a low pressure in the tires is desirable.

The example system 44 includes an actuator 60, a first sensor 64, and a second sensor 68, a controller 72, and a container 76. The controller 72 is operative to adjust the actuator 60 to control flow of fluid between the container 76 and the tires 48a to 48d. In this example, the controller 72 adjusts the actuator 60 in response to information collected from the first sensor 64, the second sensor 68, or both. In another example, the controller 72 adjusts the actuator 60 in response to other information.

The actuator 60 in this example comprises an electrically actuated valve that permits flow of fluid, such as air, between the container 76 and the tires 48a to 48d. The actuator 60 may further incorporate an electric pump to force fluid to move between the container 76 and the tires 48a to 48d. In this example, the actuator 60 controls flow of fluid to all of the tires 48a to 48d.

To deflate the tires 48a to 48d, the example controller 72 opens the actuator 60 to permit flow of fluid from the tires 48a to 48d to the container 76. A pressure differential between a pressure within the tires 48a to 48d and a pressure within the container 76 can cause flow to move to the container 76 from the tires 48a to 48d. When a desired amount of flow has exited the tires 48a to 48d, the controller 72 closes the actuator 60.

Notably, the controller 72 can open the actuator 60 when the vehicle 40 is moving or stationary. The system 44 thus is able deflate the tires 48a to 48d when the vehicle 40 is moving or stationary.

To inflate the tires 48a to 48d, the example controller 72 opens the actuator 60 to permit flow of fluid from the container 76 to the tires 48a to 48d. A pump or another type of inflator device can cause flow to move to the tires 48a to 48d from the container 76. When a desired amount of flow has entered the tires 48a to 48d, the controller 72 closes the actuator 60.

The example controller 72 opens and closes the actuator 60 in response to a condition change. In this example, the sensors 64 and 68 detect condition changes. The controller 72 evaluates the condition changes to see the condition changes necessitate a change or a decrease in pressure within the tires 48a to 48d.

Figure 3:
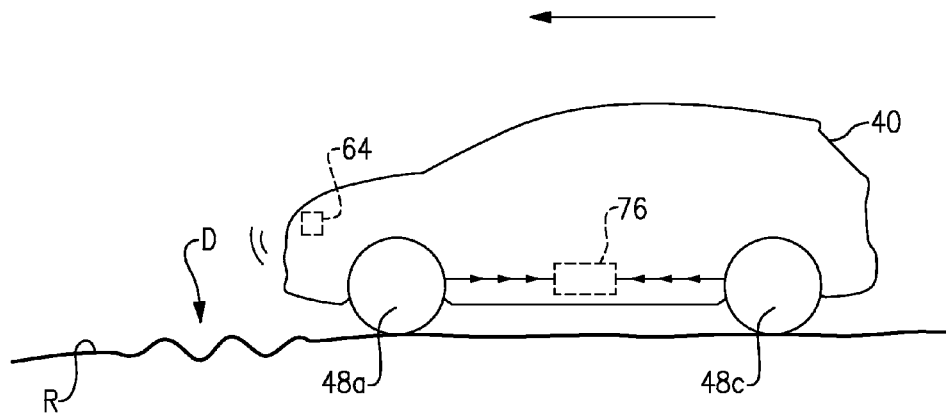
FIG. 3 illustrates a partially schematic view of the vehicle of FIG. 2 decreasing a tire pressure in response to an increase in road disturbance.
Figure 4:
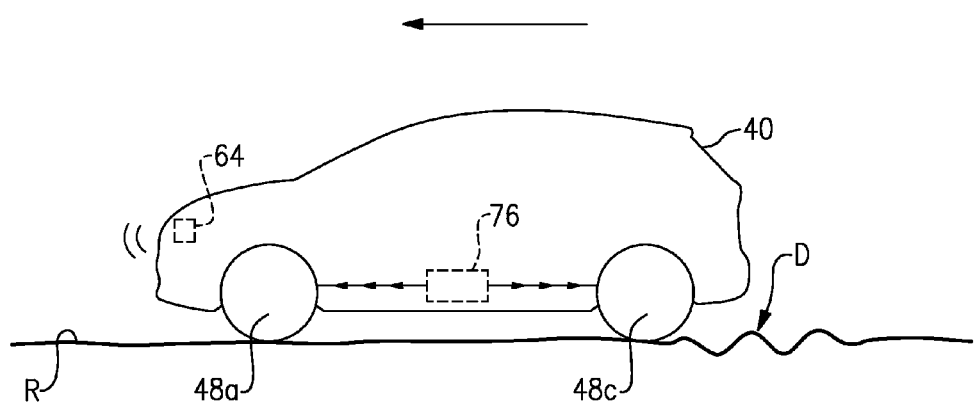
FIG. 4 illustrates the vehicle of FIG. 3 increasing the tire pressure in response to a decrease in road disturbance.

Referring to FIGS. 3 and 4 with continued reference to FIGS. 1 and 2, an example condition change comprises detecting a disturbance D in a road R that the vehicle 40 is moving along. The disturbance D may be a pothole, speed bump, or some other irregularity in a surface of the road R that would disrupt a ride experience for an occupant of the vehicle 40 if the vehicle 40 is moved across the disturbance D when the tires have a relatively high pressure, which is from 50 to 60 pounds per square inch in this example.

Algorithms, testing, and other assessment methodologies may be utilized to determine when the disturbance D is significant enough to require a reduction in tire pressure. The controller 72 may include a threshold level saved in memory. A disturbance D greater than the threshold value is considered a condition change, and would cause the controller 72 to reduce tire pressure.

In this example, the sensor 64 detects the disturbance D. The sensor 64 may comprise a forward road sensing technology, such as sensing technology sold under the trademark LIDAR. The sensing technology can, for example, use a sweeping laser pulse and light detection to create a detailed image of the road ahead using the reflective laser pulses. The sensing technology may detect a disturbance D that will be underneath the vehicle 40 in about four seconds if speeds of the vehicle are maintained.

After receiving information about the disturbance D from the sensor 64, the controller 72 commands the actuator 60 to open, which causes fluid from the tires 48a to 48d to dump into the container 76. Fluid is dumped until the fluid pressure within the tires 48a to 48d is reduces to a level that provides an acceptable level of disruption when the vehicle 40 moves across the disturbance D.

In this example, a pressure of the tires before the actuator 60 opens is from 50 to 60 pounds per square inch. As the vehicle 40 moves across the disturbance D, the pressure has been reduced to about 40 to 45 pounds per square inch. The reduction in pressure enhances friction between the tires 48a to 48d and the road R. Reducing the pressure also provides cushioning.

The reduction in pressure occurs quickly and may take place in less than 1.5 seconds in some examples. The reduction in pressure may be a reduction of from 10 to 15 pounds per square inch. The specific pressure ranges depend on the on the tire type, environmental conditions, etc.

After the vehicle 40 moves past the disturbance D as shown in FIG. 4, the vehicle 40 is moving along a section of road R lacking a disturbance that would cause an unacceptable level of disruption. The controller 72 thus reopens the activator 60 and starts a pump or other device to move fluid back from the container 76 to the tires 48a to 48d. This causes the tires 48a to 48d to repressurizes to 50 to 60 pounds per square inch. Inflating the tires 48a to 48d may take much longer than the deflating. In some examples, the inflating may take up to twenty seconds.

Figure 5:
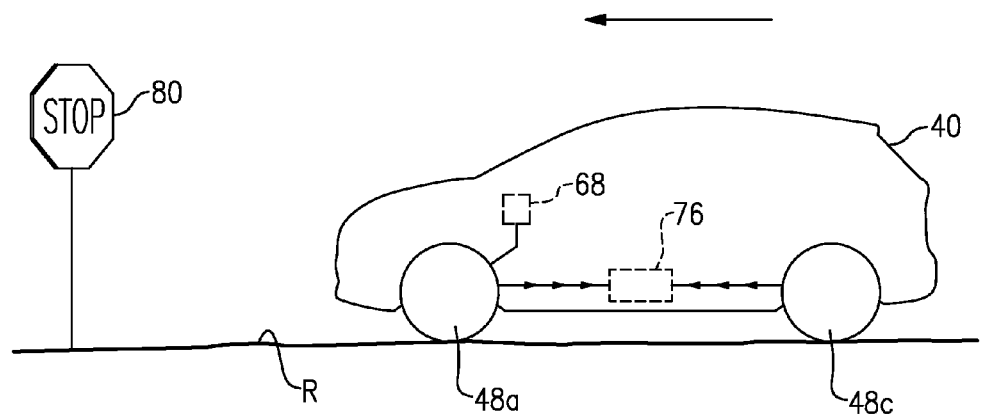
FIG. 5 illustrates the example vehicle of FIG. 2 decreasing a tire pressure in response to a deceleration.
Figure 6:
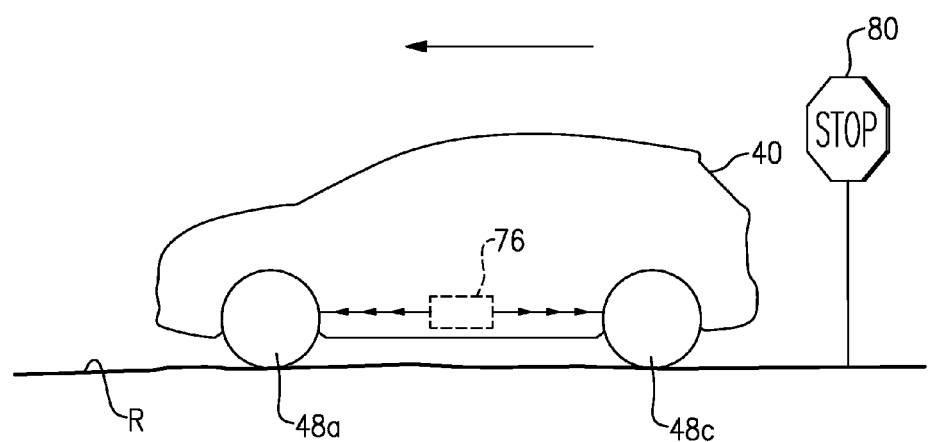
FIG. 6 illustrates the vehicle of FIG. 2 increasing tire pressure in response to an acceleration.

Referring now to FIGS. 5 and 6 with continuing reference to FIGS. 1 and 2, the controller 72 may further selectively increase and decrease pressure within the tires 48a to 48d in response to a condition change detected by the sensor 68. In this example, the sensor 68 is an accelerometer or brake sensor capable of detecting, among other things, that the powertrain 10 is slowing down or approaching a stop 80. The sensor 68 could detect movement of the brake pedal for example.

Decelerating when approaching the stop 80 represents a condition change. The controller 72 receives this condition change from the sensor 68 and commands the actuator 60 to open so that the pressure in the tires 48a to 48d can be reduced.

The sensor 68 then detects acceleration after the deceleration or stop. The controller 72 may interpret this information from the sensor 68 as another condition change and commands the actuator 60 to open to pressurizing the tires 48a to 48d utilizing fluid stored within the container.

Referring again to FIGS. 1 and 2, the example container 76 is a bladder that holds fluid communicated from the tires 48a to 48d, and provides fluid for inflating the tires 48a to 48d. The pressure of the tires 48a to 48d is thus increased using fluid that exited the tires 48a to 48d during the decreasing.

In another example, the container 76 is omitted and fluid from the tires 48a to 48d during the decreasing is dumped to atmosphere. In such an example, a pump may then be activated to increase a pressure in the tires 48a to 48d using fluid drawn from atmosphere or some other fluid supply.

The example system 44 uses an actuator 60 including a single pump that pressurizes lines that run to the tires 48a to 48d. The actuator 60 may include several valves associated with each of the tires 48a to 48d. The valve can be located on each of the tires 48a to 48d.

For example, the vehicle 40 could include four pairs of actuators and pumps, each pair associated with one of the tires 48a to 48d. In such an example, the controller 72 can pressurize one or more of the tires 48a to 48d to have an internal fluid pressure differing from one or more of the other tires 48a to 48d.

The powertrain 10 of the example vehicle 40 may benefit and store energy from braking, such as by incorporating a regenerative braking system. In some examples, energy from the regenerative braking may be utilized to power the electric pump or pumps.

Separate containers could also be used for each of the tires 48a to 48d rather than combining the fluid used to inflate the tires in the container 76.

In another example, the system 44 includes a mechanical piston instead of the actuator 60. The mechanical piston may store fluid from one or more of the tires 48a to 48d when the tires 48a to 48d are depressurized. The piston can include a spring that is biased by the centrifugal forces from the tires 48a to 48d when the vehicle 40 is moving.

When fluid is required to reinflate the tires 48a to 48d, the spring within the piston is unbiased and forces fluid from the piston into one or more of the tires 48a to 48d.

When the controller 72 is utilized within an arrangement to individually control the pressure on the tires 48a to 48d, the system acts as a shock absorber associated with one of the tires 48a to 48d.

The example system 44 response to condition changes such as braking, or road roughness. Other example systems may respond to condition changes such as a change in a physical position of the vehicle. For example, the controller 72 may inflate or deflate the tires 48a to 48d based on the position of the vehicle 40 within a route.

If, for example, a stored GPS map indicates that the current road is gravel or other rough surface, the tire pressure may be intentionally left at a lower value to avoid inflating very briefly or constantly inflating and deflating. In addition to GPS road surface information, road roughness history can be stored and displayed on a navigation display for future use to avoid excessive inflation cycles on rough roads.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
    decreasing the pressure within at least one tire of a vehicle when the vehicle is moving, the decreasing in response to a first condition change;
    capturing an amount of fluid from the at least one tire during the decreasing; and
    using the amount of fluid to increase the pressure within the at least one tire in response to a second condition change different than the first condition change,
    wherein the first condition change is detected by a forward road sensing sensor mounted to the vehicle which detects a road disturbance by monitoring an area of the road that is forward of the vehicle,
    wherein the road disturbance is an irregularity in a surface of the road that exceeds a threshold level, and
    wherein the pressure in the at least one tire of the vehicle is decreased before the vehicle moves across the disturbance and increased after the vehicle has moved past the disturbance.

2. The method of claim 1, wherein the vehicle is an electric vehicle.

3. The method of claim 1, causing the decreasing by actuating an electric valve.

4. The method of claim 1, further comprising powering the increasing using energy recovered from regenerative braking.

5. The method of claim 1, wherein the at least one tire comprises a first tire and a second tire, the pressure within the first tire being decreased more than the pressure within the second tire in response to the condition change.

6. The method of claim 5, wherein the pressure on the second tire is maintained during the decreasing.

7. The method of claim 1, wherein the irregularity is a pothole.

8. The method of claim 1, wherein the irregularity is a speed bump.

9. The method of claim 1, wherein the threshold level is saved in a memory portion of a controller of the vehicle.

10. An assembly, comprising:
    a forward road sensing sensor that detects a road disturbance by monitoring an area of the road that is forward of the vehicle, the road disturbance being an irregularity in a surface of the road that exceeds a threshold level;
    a tire pressure controller that causes a decrease in a pressure within at least one tire of a vehicle before the vehicle moves across the disturbance in response to a first condition detected by the sensor, and that causes an increase in the pressure within the at least one tire of the vehicle after the vehicle has moved past the disturbance in response to a second condition detected by the sensor, the second condition different than the first condition; and
    a container in selective communication with the at least one tire and configured to hold an amount of fluid from the decrease so that the amount of fluid can be reused to increase the pressure.

11. The assembly of claim 10, wherein the tire pressure controller causes the decrease when the vehicle is moving.

12. The assembly of claim 10, wherein the vehicle is an electric vehicle.

13. The assembly of claim 10, wherein the container comprises a bladder.

14. The assembly of claim 10, further comprising a fluid pump to increase the pressure, the fluid pump at least partially powered by energy from regenerative braking of the vehicle.

15. The assembly of claim 10, wherein the irregularity is a pothole.

16. The assembly of claim 10, wherein the irregularity is a speed bump.

17. The assembly of claim 10, wherein the threshold level is saved in a memory portion of the tire pressure controller.

18. An assembly, comprising:
    a forward road sensing sensor that detects a road disturbance by monitoring an area of the road that is forward of the vehicle, the road disturbance being an irregularity in a surface of the road that exceeds a threshold level;
    a container configured to hold fluid from at least one tire of a vehicle; and
    a tire pressure controller configured to cause an amount of fluid to move from the at least one tire to the container to decrease the pressure in the at least one tire before the vehicle moves across the disturbance, and further configured to cause the amount of fluid to move from the container to increase the pressure in the at least one tire after the vehicle has moved past the disturbance.

19. The assembly of claim 18, wherein a pressure of the tire is lower when the amount of fluid is within the container, and the pressure of the tire is higher when the amount of fluid is within the tire.

20. The assembly of claim 18, wherein the irregularity is a pothole or a speed bump.

21. The assembly of claim 18, wherein the threshold level is saved in a memory portion of the tire pressure controller.

* * * * *